US011005221B2

(12) United States Patent
Führer (10) Patent No.: US 11,005,221 B2
(45) Date of Patent: May 11, 2021

(54) CHARGING PLUG AND CHARGING STATION FOR A MOTOR VEHICLE

(71) Applicant: Phoenix Contact E-Mobility GmbH, Schieder-Schwalenberg (DE)

(72) Inventor: Thomas Führer, Blomberg (DE)

(73) Assignee: Phoenix Contact E-Mobility GmbH, Schieder-Schwalenberg (DE)

( * ) Notice: Subject to any disclaimer, the term of this patent is extended or adjusted under 35 U.S.C. 154(b) by 0 days.

(21) Appl. No.: 16/171,581

(22) Filed: Oct. 26, 2018

(65) Prior Publication Data

US 2019/0126764 A1  May 2, 2019

(30) Foreign Application Priority Data

Oct. 27, 2017 (DE) .................... 10 2017 125 265.7

(51) Int. Cl.
*H02J 7/00* (2006.01)
*H01R 13/66* (2006.01)
*B60L 53/16* (2019.01)
*B60L 53/31* (2019.01)
*G01M 3/16* (2006.01)
*H01R 13/00* (2006.01)
*H01R 13/533* (2006.01)

(52) U.S. Cl.
CPC .......... *H01R 13/6683* (2013.01); *B60L 53/16* (2019.02); *B60L 53/31* (2019.02); *G01M 3/16* (2013.01); *H01R 13/005* (2013.01); *B60L 2230/12* (2013.01); *B60L 2270/32* (2013.01); *H01R 13/533* (2013.01); *H01R 2201/26* (2013.01)

(58) Field of Classification Search
CPC ............................ H01R 13/6683; B60L 53/16

USPC ......................................................... 320/109
See application file for complete search history.

(56) References Cited

U.S. PATENT DOCUMENTS

| 5,177,996 | A * | 1/1993 | Sahakian | G01M 3/165 324/533 |
|---|---|---|---|---|
| 10,867,723 | B2 * | 12/2020 | Cao | B60L 53/14 |
| 2011/0204849 | A1 * | 8/2011 | Mukai | B60L 3/0069 320/111 |
| 2013/0193918 | A1 * | 8/2013 | Sarkar | B60L 3/04 320/109 |
| 2013/0342164 | A1 * | 12/2013 | Choi | B60L 53/14 320/109 |
| 2015/0217654 | A1 * | 8/2015 | Woo | H02J 7/0029 320/109 |
| 2016/0149394 | A1 * | 5/2016 | Trusty | H02H 5/083 361/59 |
| 2016/0193932 | A1 * | 7/2016 | Vaghefinazari | H02J 7/0021 320/109 |
| 2016/0270257 | A1 * | 9/2016 | Mark | G06F 1/20 |
| 2016/0280084 | A1 * | 9/2016 | McGrath | B60L 5/42 |

(Continued)

FOREIGN PATENT DOCUMENTS

DE  10026968 A1  12/2001
DE  102007032250 B3  12/2008

(Continued)

*Primary Examiner* — Suchin Parihar
(74) *Attorney, Agent, or Firm* — Occhiuti & Rohlicek LLP (57) ABSTRACT

A charging plug, having a housing for accommodating power contacts and
  power contacts for power transmission, and having
  an apparatus for detecting liquid, which apparatus is configured to detect liquid collecting inside the housing.

17 Claims, 8 Drawing Sheets

(56) References Cited

U.S. PATENT DOCUMENTS

| | | | |
|---|---|---|---|
| 2016/0336761 A1* | 11/2016 | Hsu | H02J 7/0029 |
| 2017/0366024 A1* | 12/2017 | Chen | H02J 7/0029 |
| 2018/0170202 A1* | 6/2018 | Kim | B60H 1/00392 |
| 2018/0190410 A1* | 7/2018 | Cao | H01B 9/006 |
| 2018/0284047 A1* | 10/2018 | Kim | G01N 27/048 |
| 2018/0345804 A1* | 12/2018 | Nagel | B60L 11/1818 |
| 2019/0017801 A1* | 1/2019 | Gotz | B60L 53/31 |
| 2019/0079037 A1* | 3/2019 | Jol | G01N 27/048 |
| 2019/0109480 A1* | 4/2019 | Hsu | H02J 7/0036 |
| 2019/0302047 A1* | 10/2019 | Park | H02H 1/0007 |
| 2019/0339322 A1* | 11/2019 | Schade | G01R 31/58 |
| 2020/0303093 A1* | 9/2020 | Cantz | H01R 13/506 |

FOREIGN PATENT DOCUMENTS

| | | | |
|---|---|---|---|
| DE | 102011076183 A1 | 11/2012 | |
| DE | 102016105311 A1 | 3/2016 | |
| DE | 202016104369 U1 | 11/2016 | |
| JP | 60046457 A | 3/1985 | |

\* cited by examiner

CHARGING PLUG AND CHARGING STATION FOR A MOTOR VEHICLE

CROSS REFERENCE TO RELATED APPLICATIONS

This application claims the benefit of the priority date of German Application No. 10 2017 125 265.7 filed on Oct. 27, 2017.

The invention relates to a charging plug, having a housing for accommodating power contacts and having power contacts for power transmission. The invention further relates to a charging station for motor vehicles having a charging plug of this kind.

Charging plugs and charging stations of the type mentioned at the beginning are used, for example, to charge a battery of a vehicle having an electric motor.

The possible plug connections between vehicles and charging stations are standardized and can accordingly be modified only within strict limits prescribed by the standardization. This is in contrast to the demand for ever further increasing the charging power in order to shorten the charging time. The intention is therefore to transmit ever higher charging powers via the standardized connections. For example, charging currents of up to 350 amperes are intended to be made possible.

In order to make high charging powers possible, a charging plug can be actively cooled in order to dissipate the heat arising in the region of the plug connection. As a result, damage to the charging plug or to the vehicle due to overheating can be avoided. In principle, active cooling of a charging plug accordingly makes a rapid yet safe charging process possible.

However, there is the danger that, on account of leakage of the cooling system, cooling fluid collects in an interior of the housing and the power contacts are shorted by means of the leaking cooling fluid.

Independently of the use of active cooling systems, there is the danger that, on account of a damaged housing or improper use, liquid penetrates the charging plug and the power contacts are shorted.

Such a short involves a high risk of injury for the operator and can also lead to damage of the charging plug, the charging station and the vehicle that is to be charged.

Proceeding from the prior art described above, the invention is based on the technical problem of specifying a charging plug and a charging station that do not have the disadvantages described above or have them at least to a reduced extent and, in particular, make it possible to transmit power safely.

The technical problem described above is solved by a charging plug according to Claim 1 and a charging station according to Claim 10.

According to a first aspect, the invention relates to a charging plug having a housing for accommodating power contacts and having power contacts for power transmission. The charging plug has an apparatus for detecting liquid, which apparatus is configured to detect liquid collecting inside the housing.

It is possible to use the detector to identify whether liquid is located inside the housing. If liquid is detected in the housing, safety measures can be taken. For example, a charging process of a charging station can be terminated or the start of a charging process can be prevented.

The detector can be configured for connection to a control unit of a charging station in order, for example, to make it possible to terminate the power supply of the charging plug autonomously in the event of detection of liquid in the housing.

The safety of a charging process can be improved as a result of this by virtue of a short of power contacts due to liquid being avoided and/or a possible short being able to be indicated.

When collecting liquid is spoken of in the present case, this can be an individual drop of liquid, a plurality of drops of liquid or a larger amount of liquid.

The charging plug can be configured to transmit charging currents of up to 350 amperes in order to make a rapid charging process of a battery of an electric vehicle possible.

The charging plug can have a handle provided on the housing in order to improve the handling of the charging plug.

The charging plug can be a charging plug according to standard IEC 62196 in order to make it possible to use it for a multiplicity of electric vehicles.

The charging plug can be a DC charging plug for a so-called combined AC/DC charging system (CCS), which is a charging plug system for electric vehicles according to IEC 62196, wherein a charging socket of the vehicle supports AC charging (alternating current) and DC charging (direct current). The combined AC/DC charging system essentially consists of a vehicle-side CCS socket, the so-called inlet, and the charging plug. The vehicle-side CCS socket is accordingly equally suitable for receiving an AC charging plug or a DC charging plug.

The charging plug can be a charging plug that is configured for a charging process of a battery using direct current in order to make rapid charging possible, for example at a publicly accessible rapid-charging station.

The charging plug can be a charging plug that is configured for a charging process of a battery using alternating current in order to make gentle charging possible, for example at a charging station for private use.

The charging plug can be a charging plug that is configured for a charging process of a battery using direct current and/or alternating current in order to make flexible use of the charging plug possible.

According to a further refinement of the charging plug, provision is made for the apparatus for detecting liquid to have at least one detector element having a conductor track structure, wherein the detector element is arranged in an interior of the housing and wherein the conductor track structure forms a detection face for detecting liquid.

A liquid detector having a conductor track structure is known in principle, wherein reference is made to DE 10 2007 032 250 B3 with respect to the functioning of such a detector.

The present conductor track structure can have at least two conductor tracks, which are at a distance from one another and are associated with separate poles.

It is possible to set the sensitivity of the detector with respect to a drop size or amount of liquid that can be detected through the distances between adjacent conductor tracks. The smaller the distance between the conductor tracks, the smaller the drop size or amount of liquid that causes bypassing of the conductor tracks and that can consequently be detected.

The conductor track structure forms a detection face or spans a detection face, in the region of which liquid can be detected.

At least one conductor track of the conductor track structure or the entire conductor track structure can have a corrosion protection coating. For example, a conductor track of the conductor track structure or the entire conductor track structure can be gold-plated.

There can be provision for the detection face to at least partly cover and/or span a housing inner face that faces towards the interior. In particular, free housing faces of the interior can thus be covered in sections or completely with the detector.

The housing inner face can have, in particular, at least one bottom face that faces towards the interior and/or at least one side face that faces towards the interior. A bottom face can be covered and/or spanned entirely or partly by the detector, in particular by a detection face of the detector. As an alternative or in addition, a side face can be covered and/or spanned entirely or partly by the detector, in particular by a detection face of the detector. "Covered" here means that the detector is arranged on the respective face with a close fit, in particular without gaps. "Spanned" in the present case means that the detector entirely or partly delimits the respective face with respect to an interior that accommodates the power contacts but is at least partly stretched at a distance from or so as to form a gap with respect to the respectively spanned face.

A detector element can be held or fixed in the housing in a form-fitting and/or force-fitting and/or materially bonded manner. The detector element can, for example, be adhesively bonded into the housing in order to achieve cost-effective, reliable fixing. The detector element can be placed loose into the housing. The detector element can be held in the housing by means of a latching or clamping connection.

The detector element can, for example, be a planar detector element, the width and length of which spanning the detection face is in each case a multiple of the wall thickness thereof. The wall thickness is in this case measured orthogonally to a detection face spanned by the conductor track structure. The detector element can thus be integrated into a housing in a compact manner. In particular, the detector element can be integrated or retrofitted into an existing housing without increasing the physical size or dimensions of the charging plug.

The detector element can bear, by way of a rear side that faces away from the interior, against the whole area of a side face and/or a bottom face of the housing. It is thus possible to integrate the detector element into an interior of the housing in a compact manner.

According to a further refinement of the charging plug, there is provision for the detector element to be adapted at least in sections to a shape of the housing. It is thus possible to integrate the detector element into an interior of the housing in a compact manner.

As an alternative or in addition, the planar detector element can be a flexible printed circuit board. The detector element can thus be adaptable to a shape of the housing in a non-destructive manner and without the use of tools.

According to a further refinement of the charging plug, there is provision for a substrate carrying the conductor track structure and/or the detection face and/or the conductor track structure to have a curvature. For example, a substrate carrying the conductor track structure and/or the detection face and/or the conductor track structure can be adapted to a curvature of the housing in order to achieve compact integration of the detector element into the housing. As an alternative or in addition, a substrate carrying the conductor track structure and/or the detection face and/or the conductor track structure can be embodied so as to be kinked or angled along an edge in order to follow a shape of the housing or to be arranged in a space-saving manner.

The planar detector element can have a central middle section, which at least in sections covers or spans, in particular, a housing base. At least one lateral wing, in particular two lateral wings, can adjoin the central middle section, which wings are stretched at least in sections at an angle with respect to the central middle section. The lateral wings can each at least in sections cover or span a side face of the housing. The side faces associated with the wings can face one another.

A transition region formed between the central middle section and the lateral wings can be embodied in a curved manner as viewed in a cross section, and can describe, for example, a radius so that a smooth transition of the detector element from the central middle section to the lateral wings is formed. The transition can be embodied, in particular, in a tangentially constant or curvature-constant manner as viewed in a cross section. The cross section can be oriented orthogonally to a detection face.

The detector element can be substantially U-shaped or horseshoe-shaped in a section orthogonal to the detection face or can describe an open profile.

The detector element can border power contacts stretched in the housing at least on two sides, in particular on three sides. For example, the power contacts can be arranged between two lateral wings of the detector element.

There can be provision for the detector element to have a bracket, which projects into a connection region of the housing, wherein the connection region has an opening for feeding a line or a plurality of lines into the interior of the housing. Collections of liquid in a narrow or tapered connection region can thus also be detected. The bracket is likewise provided with the conductor track structure so that the detection face reaches into the connection region. A connection region of this kind and the bracket can be embodied as tapered.

The bracket can be stretched at an angle with respect to a central middle section of the detector element in order to follow the shape of the housing.

The bracket can be stretched, relative to a central middle section of the detector element, at least in sections in a direction counter to the stretching of side brackets of the detector element in order to follow the shape of the housing.

At least one conductor track of the conductor track structure can have a corrosion protection system, in particular can be gold-plated.

There can be provision for the detector element to be substantially provided with at least two conductor tracks interconnected in a comb-like, latticed or spiral-like manner, which conductor tracks are at a distance from one another There can be provision for the conductor track structure to span the entire areal extent of the detector element in order to ensure reliable detection of liquid in the housing.

The conductor track structure can have two conductor tracks, which are coupled by means of a terminating resistor.

The detector element can have conductive surface portions or conductor tracks on a top side that faces towards the interior.

As an alternative or in addition, conductor tracks can be embedded in a substrate, such as an absorbent nonwoven or the like. In this case, the conductor tracks can be entirely or partly surrounded by the substrate.

The detection face can be arranged at least in sections below the conductor track structure as viewed along a vertical direction in order to reliably detect a collection of liquid. The orientation of the charging plug relates in this case to the use of the charging plug as intended, in particular the cases that the charging plug is coupled to a vehicle or held in a charging station.

According to a further refinement, the charging plug has a heating device for heating the apparatus for detecting liquid. In the case of unfavourable climatic conditions, condensation can form on the apparatus for detecting liquid, which can trigger a false alarm. Owing to the heating device, condensation on the apparatus for detecting liquid and hence false alarms associated therewith can be avoided.

The heating device can be controlled or connected depending on environmental conditions such as temperature, humidity, air pressure, etc.

The heating device can have at least one conductor track, which is arranged on a rear side of the detector element, which rear side faces away from the detection face. The heating device can thus be integrated into the detector element in a compact and cost-effective manner.

The conductor track can be heatable by a heating current.

Provision can be made for exactly one conductor track. Two or more conductor tracks can be provided.

In order to ensure areal coverage or an areal heat input by the heating device, the conductor track of the heating device can run in a meandering manner. As an alternative or in addition, the conductor track of the heating device can span the entire areal extent of the rear side of the detector element.

The heating device can have a PTC element or a plurality of PTC elements.

The heating device can have a layer composed of PTC material.

The PTC element and the PTC material are characterized by an electrical resistance that increases with the temperature, with the result that overheating of the heating device can be avoided without a complex control system.

Electrodes can be provided to heat the PTC element and/or the PTC material. The electrodes can be designed in an essentially punctiform, linear or latticed manner.

The PTC element and/or the PTC material and/or the electrodes can be embedded at least in sections, in particular completely, in the detector element.

According to a further refinement of the charging plug, there is provision for the charging plug to have a cooling device for actively cooling the charging plug, wherein the cooling device has at least one coolant circuit, which carries a cooling fluid, and wherein the cooling fluid is, in particular, water-based.

The combination of cooling apparatus with an apparatus for detecting liquid makes it possible to transmit high charging powers in a particularly safe manner. Leakage of cooling liquid in the housing can thus be monitored with the aid of the apparatus for detecting liquid.

If, for example, a housing interior is flooded with cooling liquid on account of cooling liquid escaping from the cooling circuit, an emergency switch-off of a charging station connected to the charging plug can be carried out in cooperation with a control system. However, for example, the leakage of an individual drop of a cooling liquid or the leakage of a plurality of individual drops of the cooling liquid can also be detected with the aid of the apparatus for detecting fluid.

The cooling liquid can be water-based and contain an antifreeze agent, such as glycol or the like.

The cooling liquid can be a mineral oil.

The cooling liquid can be a fully synthetic substance, such as fluorinated ketones or the like, for example.

According to a second aspect, the invention relates to a charging station for a motor vehicle, having a charging plug according to the invention, wherein the apparatus for detecting liquid is configured to switch off or to block a power output of the charging station in the event of the detection of liquid in the housing.

There can be provision for the apparatus for detecting liquid to be connected to a control unit of the charging station in order to trigger safety measures, such as a switch-off of the power output or the like, for example, in the event of a collection of liquid.

A first pole of a first conductor track of a detector element can be connected to a PE conductor or to an earth potential. A second pole of a second conductor track of the detector element can be constantly or intermittently supplied with a voltage via a separate feed line from the control unit.

If a liquid wets the conductor tracks, an increased flow of current can be detected due to the bypassing of the conductor tracks. For this case, a safety measure, in particular an emergency switch-off or the like, can be integrated in the control system so that, for example, the power output at the charging plug is interrupted. The increased flow of current, or the reduction in the ohmic resistance, resulting from the bypassing of the conductor tracks, can accordingly be converted to a signal, which triggers safety mechanisms of the charging device, in particular a switch-off.

As an alternative or in addition, there can be provision, before the power output, that is to say before the start of a charging process, for a check to be carried out to determine whether liquid is located in the housing. In this case, the power output can already be blocked in advance by the control unit.

Overall, it is possible to specify a charging station that makes a reliable and safe charging process possible, in particular in combination with an actively cooled charging plug.

The invention is described in more detail below with reference to a drawing illustrating exemplary embodiments. In the drawing, in each case schematically.

Figure 1:
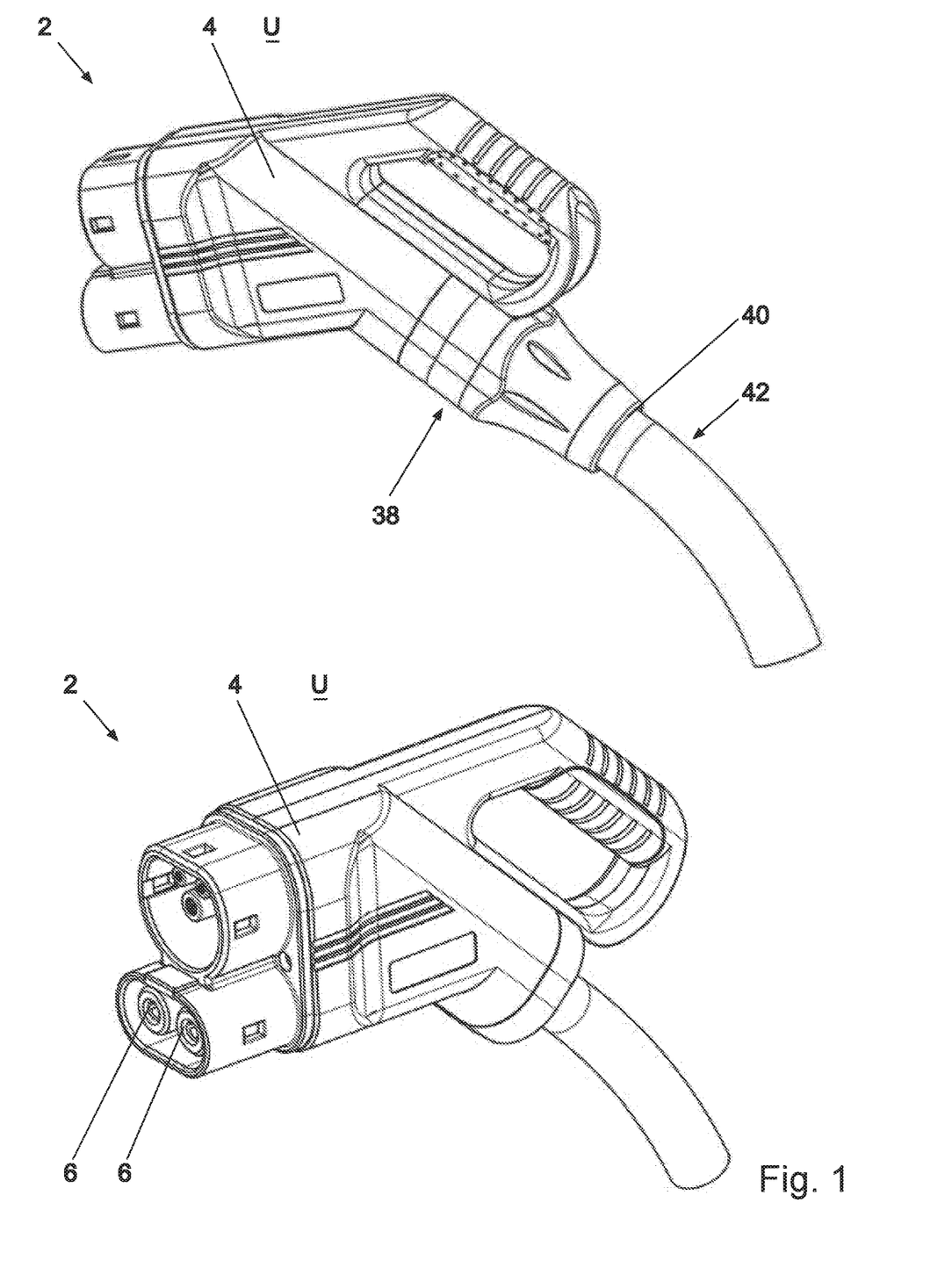
FIG. 1 shows a charging plug according to the invention.

FIG. 1 shows two perspective views of a charging plug 2. The charging plug 2 is provided to charge a battery of an electrically operated motor vehicle. The charging plug 2 is embodied in accordance with standard IEC 62196.

The charging plug 2 has a housing 4 for accommodating power contacts 6. The power contacts 6 serve to transmit power from a charging station 8 to a passenger car. The charging plug 2 is embodied to charge using direct current.

Figure 2:
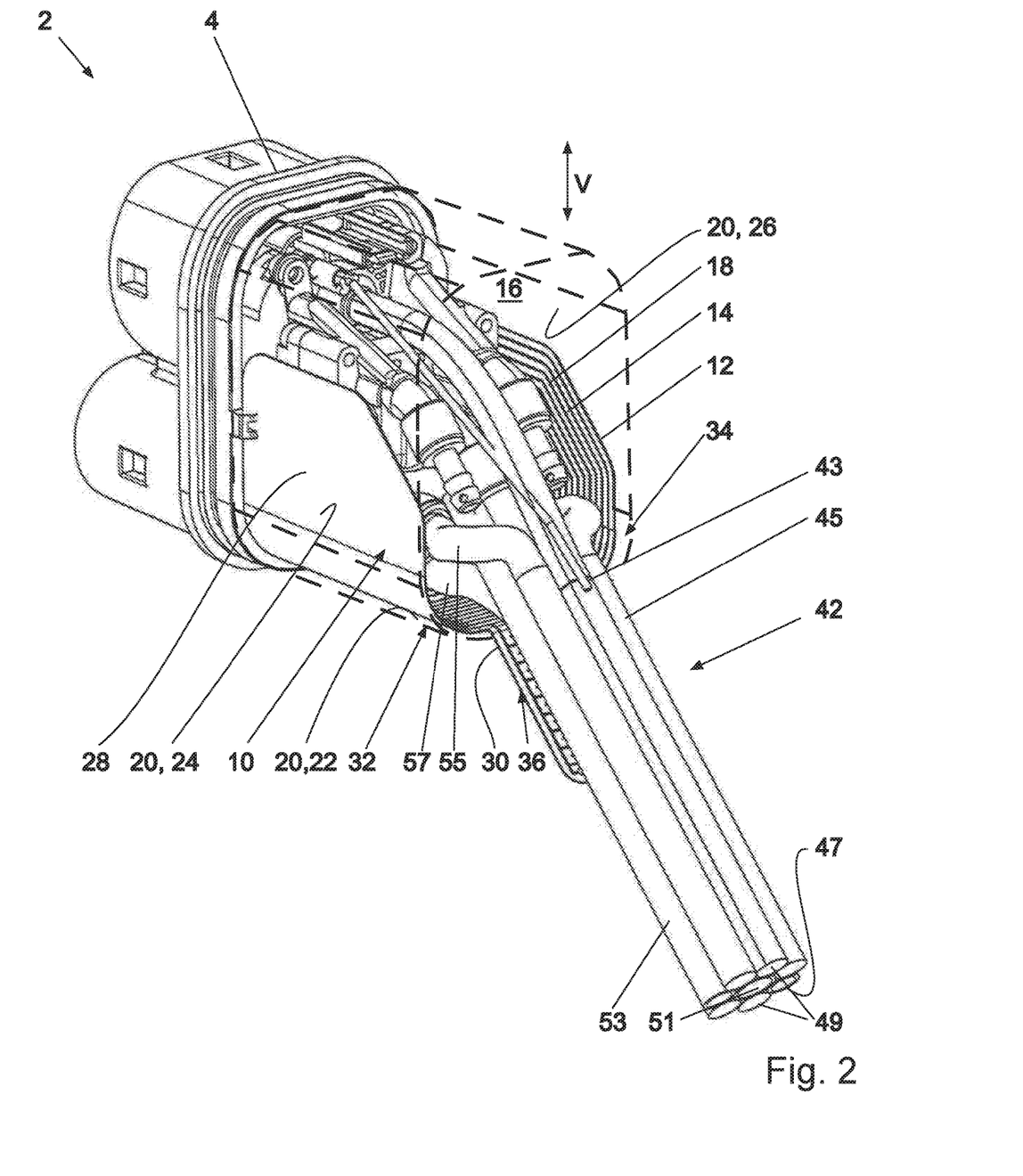
FIG. 2 shows the charging plug from FIG. 1 without a housing.

The charging plug 2 has an apparatus 10 for detecting liquid (FIG. 2). FIG. 2 shows the discharge and feed lines encapsulated by the housing 4 and the corresponding connections, wherein a part of the housing has been cut out for the purpose of illustrating the internal structures.

The apparatus 10 is configured to detect liquid collecting inside the housing 4.

The apparatus 10 for detecting liquid has a detector element 12 having a conductor track structure 14.

The detector element 12 is arranged in an interior 16 of the housing 14. The interior 16 is delimited from an environment U by the housing 4, as can be seen in FIG. 1.

The conductor track structure 14 forms a detection face 18 for detecting liquid. The detection face 18 is the entire face that faces towards the interior 16 and is spanned by the conductor track structure 14.

The detection face 18 partly covers a housing inner face 20 that faces towards the interior 16, wherein the housing inner face 20 is indicated by the dashed line of FIG. 2. The housing inner face 20 has a bottom face 22 that faces towards the interior 16 and two side faces 24, 26 that face towards the interior 16, wherein the side faces 24, 26 face one another. In the present case, the detection element 12 bears, by way of a rear side 28 that faces away from the interior 16, against the whole area of the side faces 24, 26 and the bottom face 22 of the housing 4.

The detection element 12 is a planar detection element 12. A width b and a length l of the detection element 12 are each a multiple of the wall thickness t.

The detector element 12 is adapted to a shape of the housing 4.

The detector element 12 is a flexible printed circuit board 12.

A substrate 30 carrying the conductor track structure 14, the detection face 18 and the conductor track structure 14 each have a curvature in the regions 32, 34.

The detector element 12 has a bracket 36, which projects into a connection region 38 of the housing 4. The connection region 38 of the housing 4 has an opening 40, which serves for feeding lines 42 into the interior 16 of the housing 4.

The lines 42 comprise a signal line 43, load lines 45, 49, 55, 57, an inflow cooling hose 51 and two return flow cooling hoses 47, 53.

The conductor track structure 14 has a corrosion protection system and is embodied in the present case as gold-plated.

The conductor track structure 14 has two conductor tracks 44, 46 spaced apart from one another.

The conductor tracks 44, 46 are arranged at a distance from one another and are interleaved in one another in a comb-like manner in the region of the bracket 36. In the region of a central middle section 48 of the detector element 12 and in the side brackets 50, 52 of the detector element 12 adjoining said middle section, the conductor tracks 44, 46 are arranged in a manner interleaved in one another in a spiral-like manner.

Figure 5:
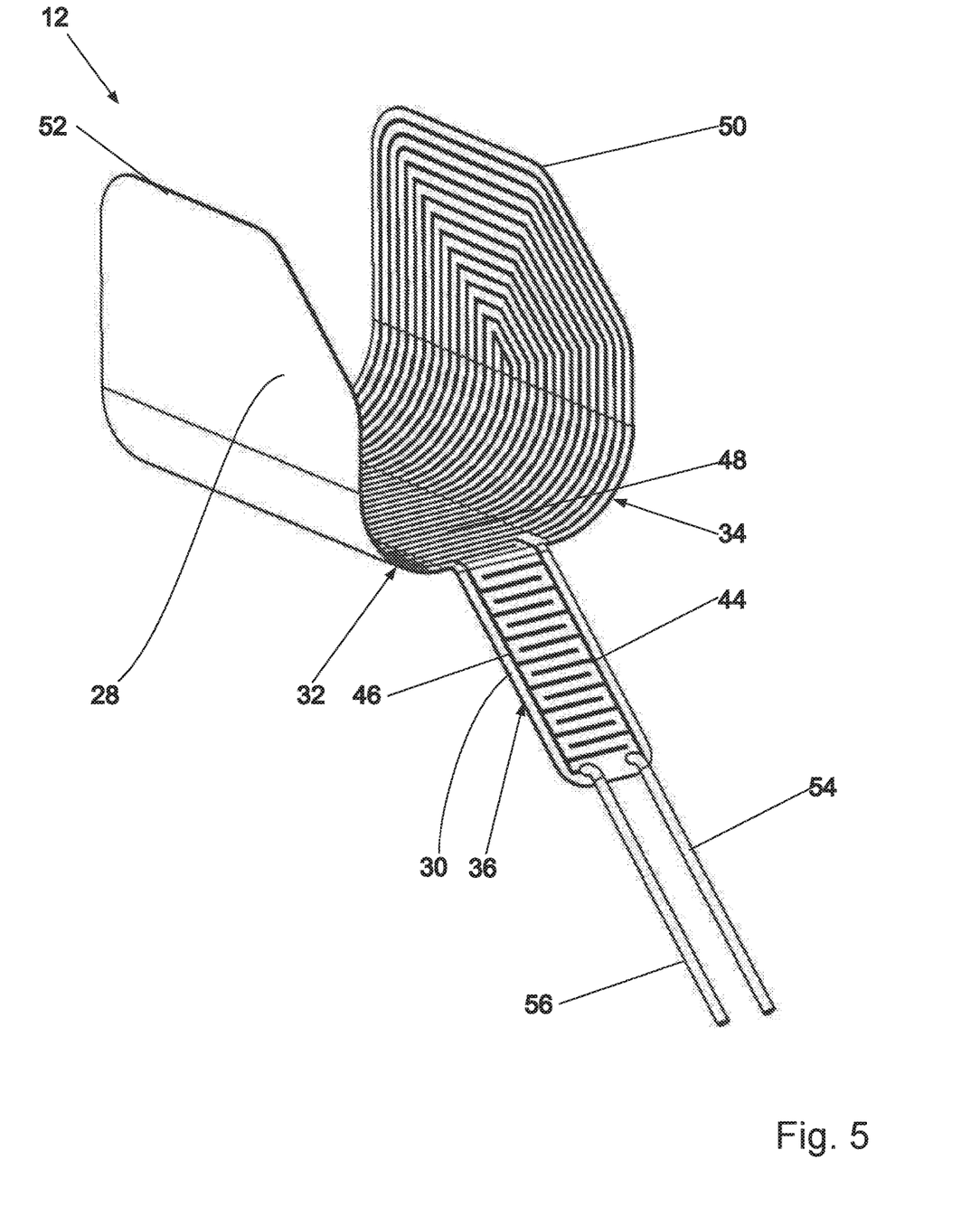
FIG. 5 shows a perspective view of an apparatus for detecting liquid.

As can be seen, in particular, in FIG. 5, the conductor track structure 14 spans the entire areal extent of the detector element 12.

Figure 3:
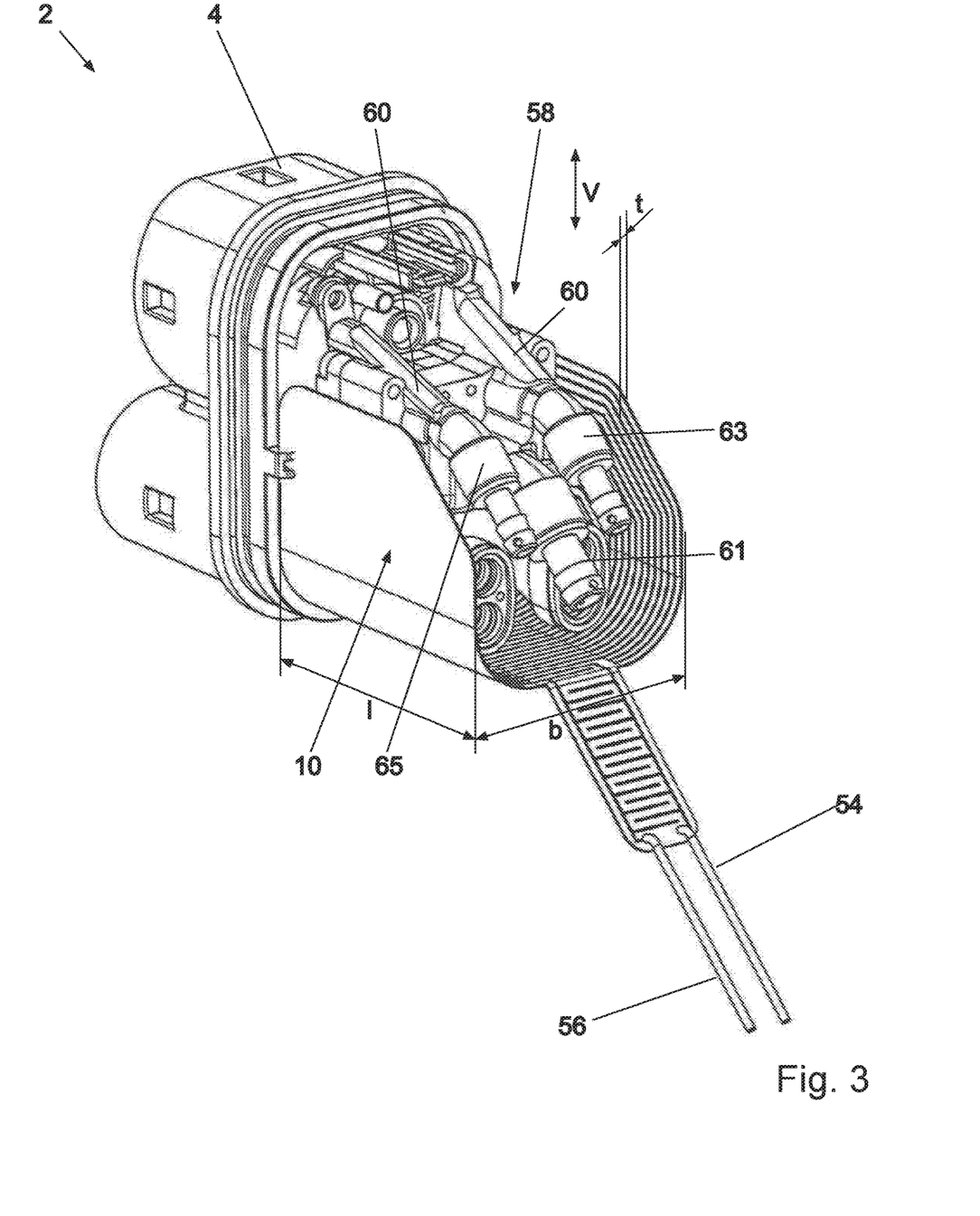
FIG. 3 shows the charging plug from FIG. 2 without supply lines.
Figure 4:
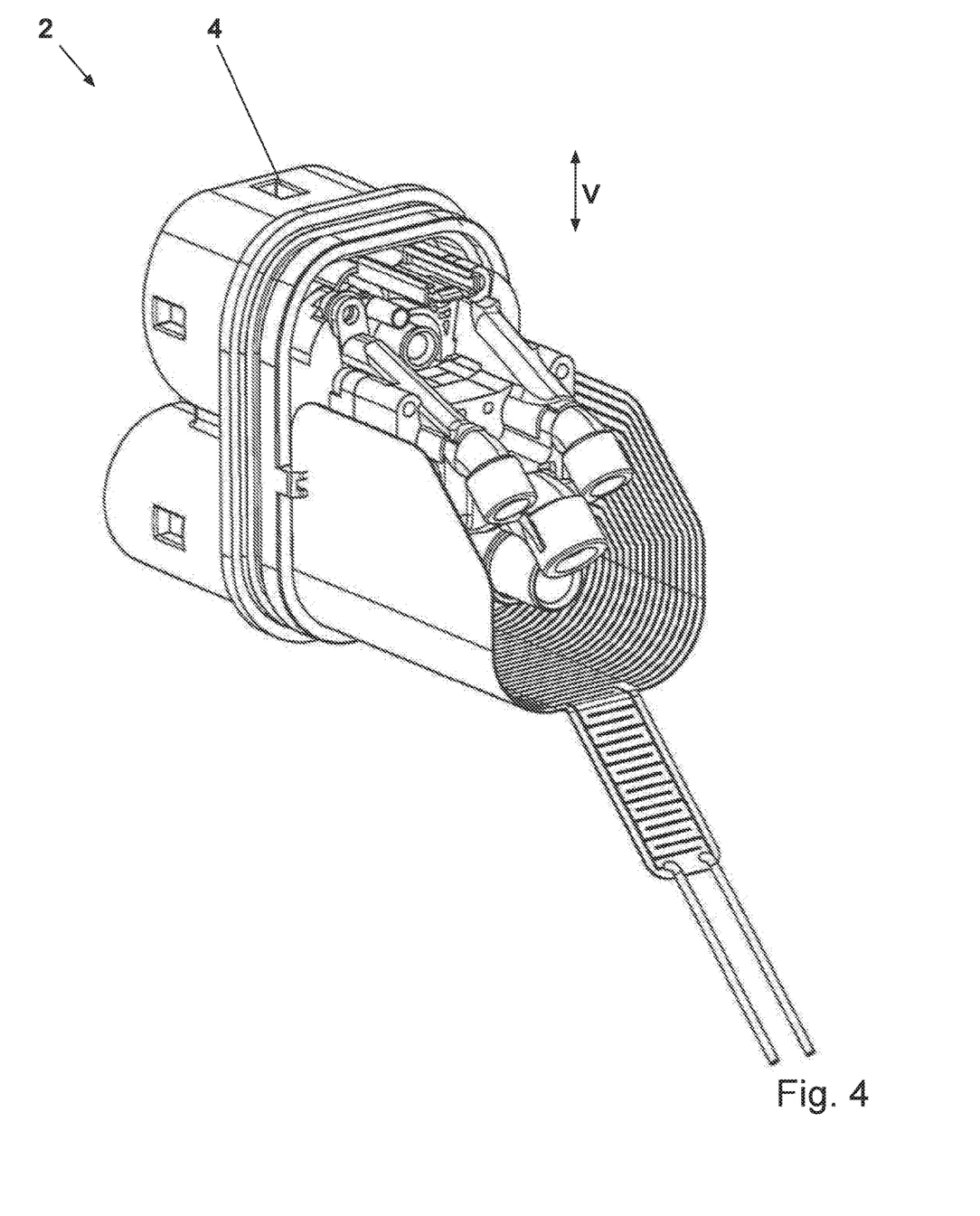
FIG. 4 shows the charging plug from FIG. 3 without connection couplings.

FIGS. 2, 3 and 4 show the orientation of the charging plug 2 during a charging process. As can be seen in the figures, the detector element 12 is arranged below the power contacts 6 as viewed along a vertical axis V in order to reliably detect liquid penetrating the interior 16.

The conductor track 44 is connected to the connection element 54. The conductor track 46 is connected to the connection element 56. The connection elements 54, 56 are embodied as sensor lines for supplying power to the detector element 12 and for communicating with the detector element 12.

The charging plug has a cooling device 58 for actively cooling the charging plug 2. The cooling device 58 has a coolant circuit, having two cooling ducts 60, a coolant inflow 61, and two coolant return flows 63, 65, which convey a cooling fluid. In the present case, the cooling fluid is water-based. Leakage of the cooling fluid encapsulated in the coolant circuit 60 to the interior 16 can be detected with the aid of the detector element 12.

Figure 6:
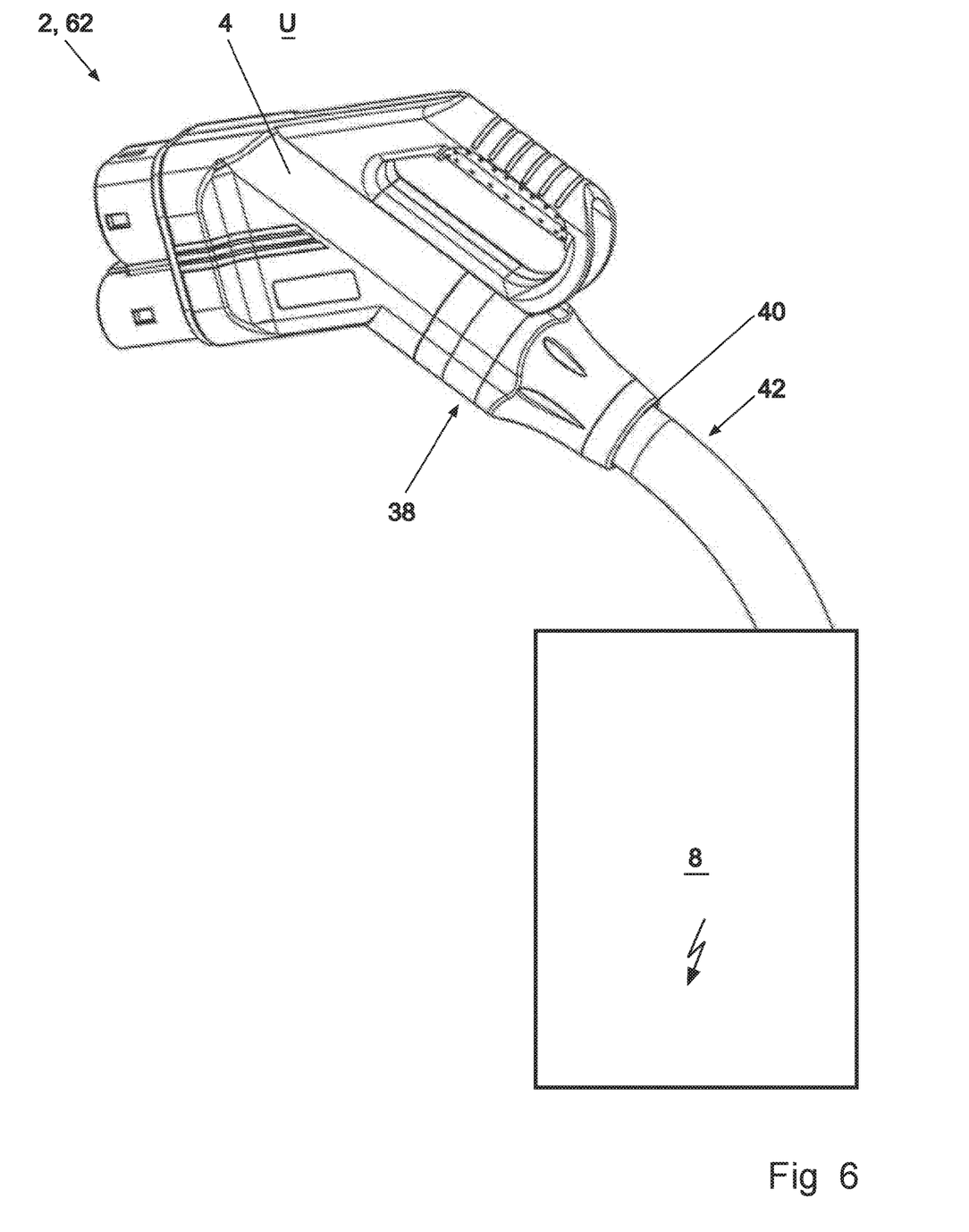
FIG. 6 shows a charging station according to the invention.

FIG. 6 shows a charging station according to the invention for a motor vehicle. The charging station 8 has a charging plug 2.

The apparatus 10 for detecting liquid is configured to switch off or to block a power output of the charging station 8 in the event of the detection of liquid in the housing 4.

Figure 7:
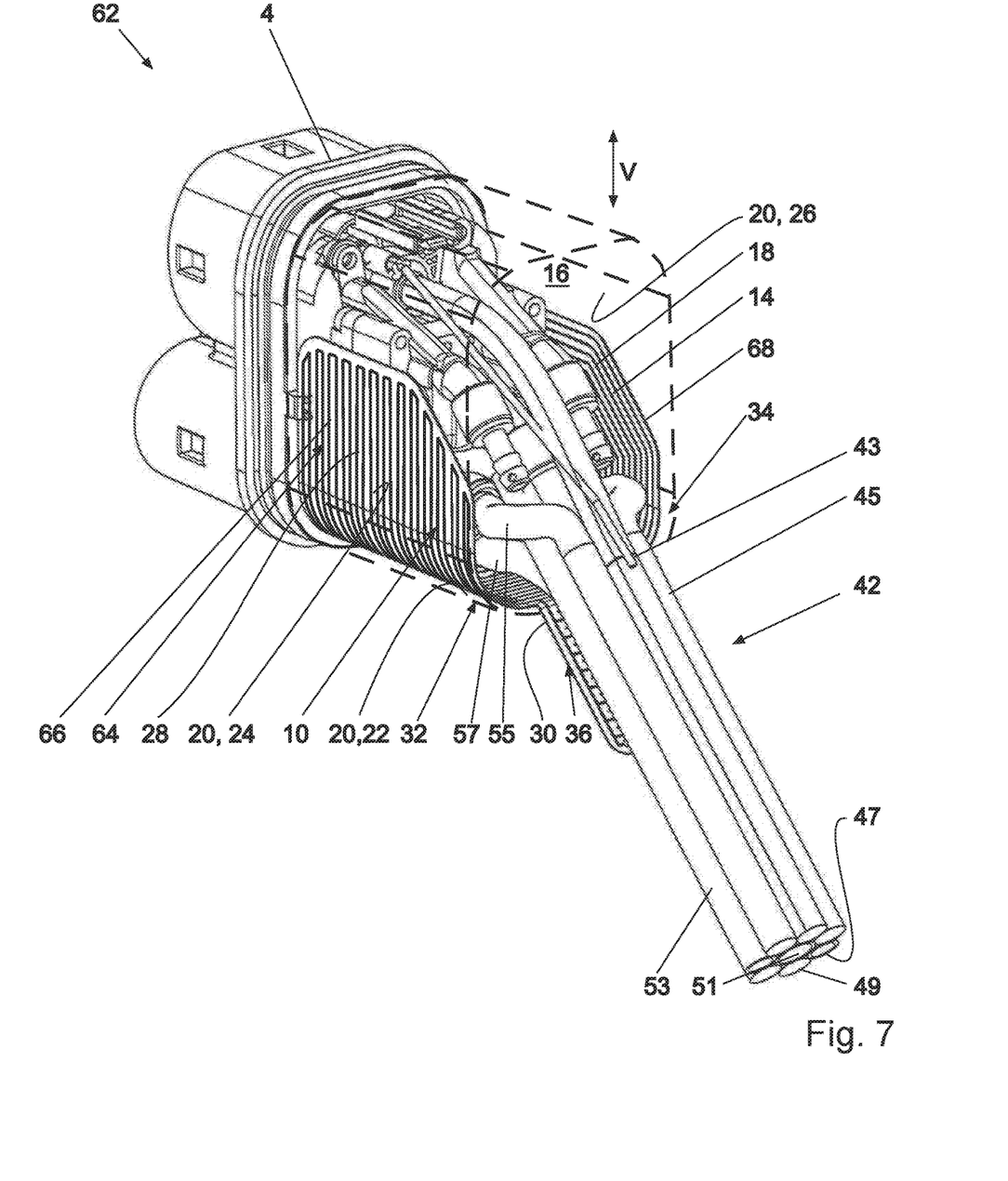
FIG. 7 shows a further charging plug according to the invention.
Figure 8:
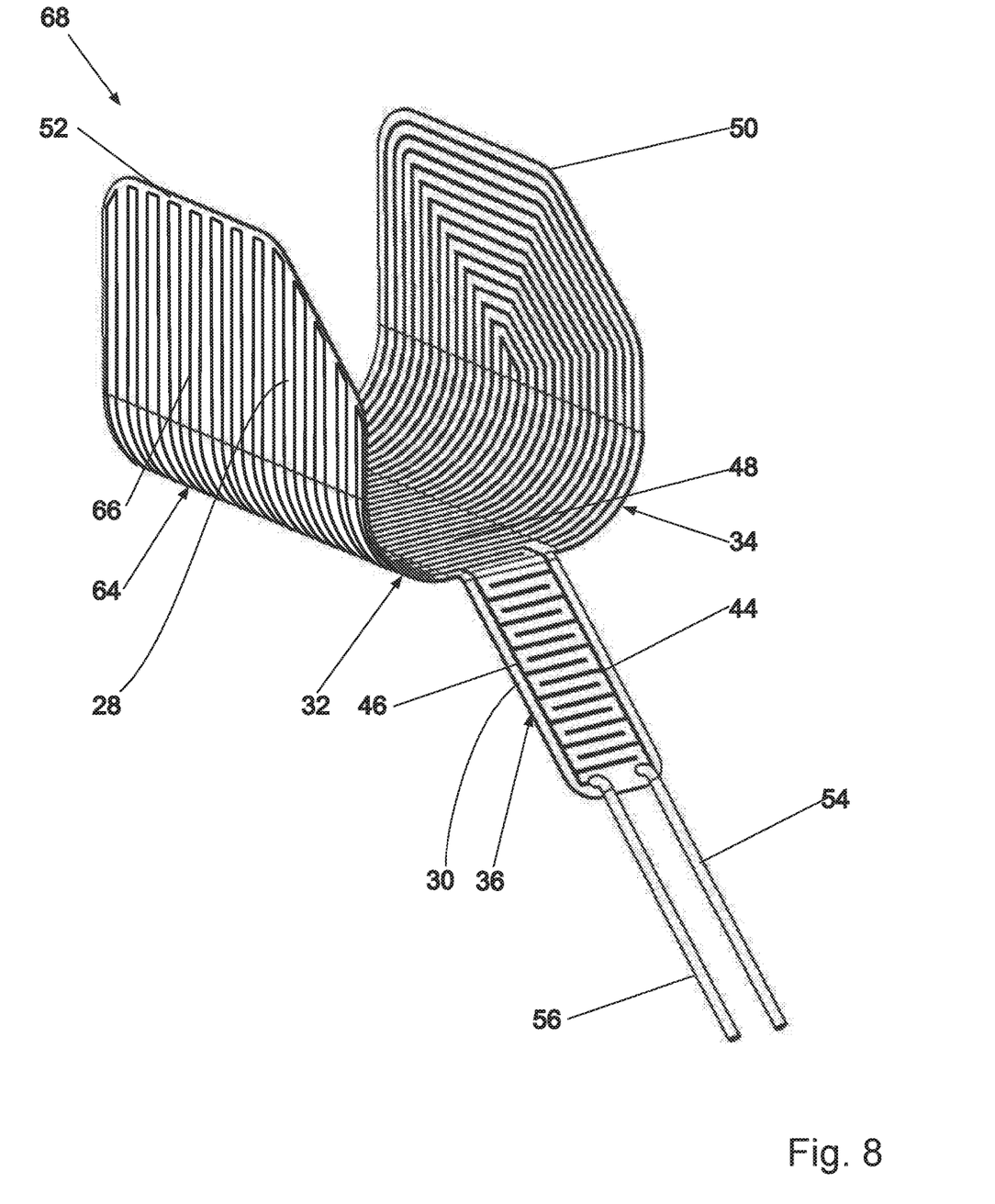
FIG. 8 shows a perspective view of a further apparatus for detecting liquid.

FIG. 7 shows a further variant of a charging plug 62 according to the invention, which can likewise be coupled to a charging station 8 (FIG. 6). To avoid repetitions, only the differences between the charging plug 62 and the charging plug 2 are dealt with below, wherein identical features in comparison to FIGS. 1 to 6 can be assigned identical reference signs in FIGS. 7 and 8.

In comparison to the charging plug 2, the charging plug 62 has a heating device 64 for heating the apparatus 10 for detecting liquid.

The heating device 64 has at least one conductor track 66, which is arranged on a rear side 28 of a detector element 68, which rear side faces away from the detection face 18. The conductor track 66 runs in a meandering manner and spans the entire areal extent of the rear side 28 of the detector element 68. The conductor track 66 is accordingly an integral constituent part of the detector element 68. The conductor track 66 can be heated by means of a heating current. To improve the clarity, the detection element 68 is illustrated separately in FIG. 8.

REFERENCE SIGNS

2 Charging plug
4 Housing
6 Power contacts
8 Charging station
10 Apparatus for detecting liquid
12 Detector element
14 Conductor track structure
16 Interior
18 Detection face
20 Housing inner face
22 Bottom face
24 Side face
26 Side face
28 Rear side
30 Substrate
32 Region/curvature
34 Region/curvature
36 Bracket
38 Connection region
40 Opening
42 Lines
43 Signal line
44 Conductor track
45 Load line
46 Conductor track
47 Cooling hose return flow
48 Central middle section
49 Load line
50 Side bracket
51 Cooling hose inflow
52 Side bracket
53 Cooling hose return flow
54 Connection
55 Load line 56 Connection
57 Load line
58 Cooling device
60 Cooling duct
61 Coolant inflow
62 Charging plug
63 Coolant return flow
64 Heating device
65 Coolant return flow
66 Conductor track
68 Detector element

The invention claimed is:

1. A charging plug, comprising:
a housing for accommodating power contacts;
power contacts for power transmission;
an apparatus for detecting liquid, configured to detect liquid collecting inside the housing, wherein the apparatus for detecting liquid has at least one detector element having a conductor track structure;
wherein the detector element is arranged in an interior of the housing; and
wherein the conductor track structure forms a detection face for detecting liquid.

2. A charging plug comprising:
a housing for accommodating power contacts;
power contacts for power transmission;
an apparatus for detecting liquid, configured to detect liquid collecting inside the housing;
a cooling device for actively cooling the charging plug, wherein the cooling device has at least one coolant circuit, which carries a cooling fluid, and wherein the cooling fluid is water-based, wherein the apparatus for detecting liquid has at least one detector element having a conductor track structure;
wherein the detector element is arranged in an interior of the housing; and
wherein the conductor track structure forms a detection face for detecting liquid.

3. The charging plug according to claim 2 wherein the detector element is a planar detector element, the width (b) and length (l) of which spanning the detection face are in each case a multiple of the wall thickness (t) thereof and/or the detector element bears, by way of a rear side that faces away from the interior, against the whole area of a side face and/or a bottom face of the housing.

4. The charging plug according to claim 2 wherein the detector element is adapted at least in sections to a shape of the housing and/or the detector element is a flexible printed circuit board.

5. The charging plug according to claim 4, wherein a substrate carrying the conductor track structure and/or the detection face and/or the conductor track structure have a curvature.

6. The charging plug according to claim 2 wherein the detector element has a bracket which projects into a connection region (38) of the housing and wherein the connection region has an opening for feeding a line or a plurality of lines into the interior of the housing.

7. The charging plug according to claim 2, wherein at least one conductor track of the conductor track structure has a corrosion protection system, in particular is gold-plated and/or the detector element is substantially provided with at least two conductor tracks interleaved in a comb-like, latticed or spiral-like manner, which conductor tracks are at a distance from one another and/or the conductor track structure spans the entire areal extent of the detector element and/or the detection face is arranged below the power contacts as viewed along a vertical direction.

8. The charging plug according to claim 2 further comprising a heating device for heating the apparatus for detecting liquid.

9. The charging plug according to claim 2 wherein the heating device has at least one conductor track, which is arranged on a rear side of the detector element, which rear side faces away from the detection face.

10. The charging plug according to claim 9, wherein the conductor track of the heating device runs in a meandering manner and/or the conductor track of the heating device spans the entire areal extent of the rear side of the detector element.

11. The charging plug according to claim 2, wherein the detection face at least one of at least partly covers and spans a housing inner face that faces towards the interior and wherein the housing inner face has at least one of at least one bottom face that faces towards the interior and at least one side face that faces towards the interior.

12. A charging station for a motor vehicle, comprising:
a charging plug having a housing for accommodating power contacts, power contacts for power transmission, and an apparatus for detecting liquid configured to detect liquid collecting inside the housing;
wherein the apparatus for detecting liquid is configured to switch off or to block a power output of the charging station in the event of the detection of liquid in the housing, wherein the apparatus for detecting liquid has at least one detector element having a conductor track structure;
wherein the detector element is arranged in an interior of the housing; and
wherein the conductor track structure forms a detection face for detecting liquid.

13. The charging station according to claim 2, wherein the housing encapsulates the power contacts.

14. The charging station according to claim 2, wherein the housing delimits an interior from an external environment.

15. The charging station according to claim 14, wherein the housing includes a housing inner face that faces toward the interior.

16. The charging station according to claim 2, wherein the housing inner face includes a bottom face, a first side face, and a second side face, wherein the bottom face, the first side face, and the second side face faces toward an interior of the housing, wherein the first side face faces the second side face.

17. The charging station according to claim 9, wherein the at least one conductor track forms a detection face that faces toward an interior of the housing.

* * * * *